United States Patent
Peterson et al.

(10) Patent No.: US 8,205,483 B1
(45) Date of Patent: Jun. 26, 2012

(54) RESIDUAL LIFE INDICATOR

(75) Inventors: Gregory W. Peterson, Belcamp, MD (US); Christopher J. Karwacki, Churchville, MD (US); David Friday, Baltimore, MD (US); Marc Shrewsbury, Perryville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1147 days.

(21) Appl. No.: 12/043,660

(22) Filed: Mar. 6, 2008

(51) Int. Cl.
*G01N 15/08* (2006.01)

(52) U.S. Cl. .......................................................... 73/38

(58) Field of Classification Search ................. 73/37, 38; 340/607
See application file for complete search history.

(56) References Cited

U.S. PATENT DOCUMENTS

| | | | |
|---|---|---|---|
| 5,992,216 A | 11/1999 | Wang et al. | |
| 6,287,023 B1 | 9/2001 | Yaegashi et al. | |
| 7,201,036 B2 | 4/2007 | Custer et al. | |
| 2002/0112605 A1 | 8/2002 | Motouji et al. | |
| 2003/0052791 A1* | 3/2003 | Reinhardt et al. | 340/607 |
| 2007/0105494 A1* | 5/2007 | Lin | 454/299 |
| 2007/0277592 A1* | 12/2007 | Johansson et al. | 73/38 |

* cited by examiner

*Primary Examiner* — Hezron E Williams
*Assistant Examiner* — David Z Huang
(74) *Attorney, Agent, or Firm* — Ulysses John Biffoni

(57) ABSTRACT

A residual life indicator for determining the residual life of a filter has a first sample filter with an inlet coupleable to an inlet of the filter whose residual life is to be determined, a second sample filter having an inlet coupleable to an outlet of the filter whose residual life is to be determined, a chemical tracer source selectively coupled to the inlets of the first and second sample filters, and a detector selectively coupled to outlets of the first and second filters.

22 Claims, 4 Drawing Sheets

RESIDUAL LIFE INDICATOR

GOVERNMENT INTEREST

The invention described herein may be manufactured, licensed, and used by or for the U.S. Government.

TECHNICAL FIELD

The present invention relates to the residual life of filters, and, in particular, to residual life indicators for filters.

BACKGROUND

Air purification systems typically provide a purified air stream to the interiors of enclosures, such as buildings, vehicles, mobile or stationary shelters, etc. These air purification systems typically use filters, such as adsorptive filters, e.g., carbon filters, to filter, e.g., adsorb, gaseous or vaporous contaminants, such as toxic gasses or vapors, e.g., gaseous or vaporous chemical and/or biological warfare agents, from an air stream to provide a purified air stream to the enclosure. One problem with some filters is that it is often hard to determine the remaining filtering capacity of the filter (often termed the residual life of the filter), such as the remaining adsorption capacity of the filter, and thus whether the filter is still capable of filtering gaseous or vaporous contaminants from an air stream.

SUMMARY

A residual life indicator for determining the residual life of a filter has a first sample filter with an inlet coupleable to an inlet of the filter whose residual life is to be determined, a second sample filter having an inlet coupleable to an outlet of the filter whose residual life is to be determined, a chemical tracer source selectively coupled to the inlets of the first and second sample filters, and a detector selectively coupled to outlets of the first and second filters.

DETAILED DESCRIPTION

Figure 1:
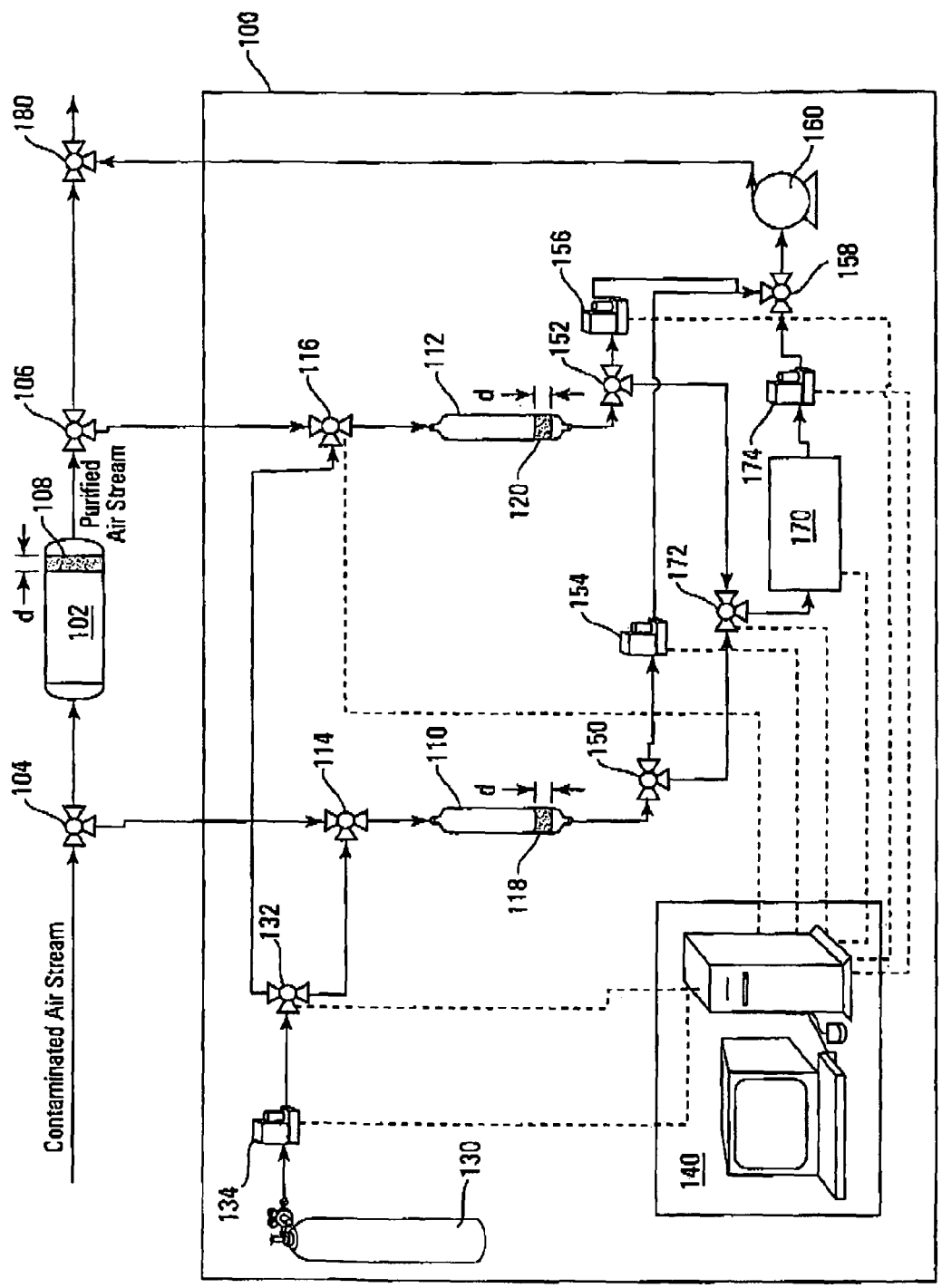
FIG. 1 schematic diagram of an embodiment of a residual life indicator for a filter coupled to the filter, according to an embodiment of the disclosure.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice these embodiments. Other embodiments may be utilized and structural, logical, and electrical changes may be made without departing from the scope of the present disclosure.

FIG. 1 is a schematic diagram of a residual life indicator 100 for determining the residual life of a main filter, such as a gas and/or particulate filter 102, e.g., that may form a portion of an air purification system, according to an embodiment. Residual life indicator 100 is coupled to filter 102 for determining the residual life of filter 102. For example, residual life indicator 100 is coupled to an inlet of filter 102, and thus to a contaminated inlet gas stream, such as an inlet air stream that may be contaminated with gaseous or vaporous contaminants, such as toxic gasses or vapors, e.g., by a tee 104. Residual life indicator 100 is also coupled to an outlet of filter 102, and thus to a purified or filtered air stream exiting filter 102, e.g., by a tee 106.

The residual life may be defined as the remaining filtering capacity of a filter, such as filter 102. Filter 102 may be an adsorptive-type filter that has an adsorptive bed 108 having a bed depth d. For example, the adsorptive bed may a carbon bed, e.g., an ASZM-TEDA carbon bed. For an adsorptive-type filter, the residual life may be defined as the remaining adsorptive capacity of the filter. During operation, filter 102 removes gaseous or vaporous contaminants, such as toxic gasses or vapors, from the contaminated inlet air stream received at its inlet and outputs a purified air stream at its outlet. For example, filter 102 may adsorb the gaseous or vaporous contaminants from the contaminated air stream.

Residual life indicator 100 includes sample filters 110 and 112 that are respectively coupled to the contaminated inlet stream and the purified outlet stream. For example, a tee 114 may couple tee 104, and thus the contaminated inlet air stream at the inlet of filter 102, to an inlet of sample filter 110, and a tee 116 may couple tee 106, and thus the purified air stream exiting filter 102 at the outlet of filter 102, to an inlet of sample filter 112, as shown in FIG. 1.

For one embodiment, sample filters 110 and 112 are substantially identical to each other. For example, sample filters 110 and 112 may respectively include substantially identical adsorptive beds 118 and 120, e.g., of carbon, such as ASZM-TEDA carbon. For another embodiment, adsorptive beds 118 and 120 may have substantially the same bed depth d. For another embodiment, each of adsorptive beds 118 and 120 may have substantially the same bed depth as adsorptive bed 108 of filter 102. For example, each of adsorptive beds 108, 118, and 120 may have the bed depth d, e.g., that could be about 5.7 cm for some embodiments.

Residual life indicator 100 also includes a chemical tracer source 130. Chemical tracer source 130 may be selectively coupled to tee 114, and thus to the inlet of sample filter 110, and to tee 116, and thus to the inlet of sample filter 112, by a three-way valve 132, for example, as shown in FIG. 1. For example, in a first state, three-way valve 132 directs chemical tracer from chemical tracer source 130 to the inlet of sample filter 110 via tee 114, and in a second state, three-way valve 132 directs chemical tracer from chemical tracer source 130 to the inlet of sample filter 112 via tee 116. In a third state three-way valve 132 prevents the chemical tracer from flowing. For one embodiment, three-way valve 132 may be electrically coupled to a controller 140 that may be an integral part of residual life indicator 100 or that may be a personal computer that is separate from residual life indicator 100. During operation, three-way valve 132 may be selectively activated, in response to receiving electrical signals from controller 140, between its first, second, and third states.

For another embodiment, a flow-rate controller 134, such as a mass or volume flow-rate controller, is coupled between an outlet chemical tracer source 130 and three-way valve 132 and thus is selectively coupled to the inlets of sample filters 110 and 112 by three-way valve 132. Flow-rate controller 134 controls the flow rate of chemical tracer from chemical tracer source 130 to the inlet of sample filter 110 when three-way valve 132 is in the first state. Flow-rate controller 134 controls the flow rate of chemical tracer from chemical tracer source 130 to the inlet of sample filter 112 when three-way valve 132 is in the second state. For example, flow-rate controller 134 is used to control the flow rate of a pulse of chemical tracer delivered to the inlet of sample filter 110 or sample filter 112 by three-way valve 132 during a certain time interval (which may be referred to as the pulse duration) during which three-way valve 132 is in either the first or second state. For one embodiment, the amount (e.g., the mass) of chemical tracer delivered to the inlet of sample filter 110 and sample filter 112 is substantially the same.

For one embodiment, flow-rate controller 134 may be coupled to controller 140 for receiving electrical signals from controller 140 that can be used to set the flow rate output by flow-rate controller 134. Note that the controller 140 can control the pulse duration for sample filter 110 by controlling the time during which three-way valve 132 is in the first state and the pulse duration for sample filter 112 by controlling the time during which three-way valve 132 is in the second state.

Chemical tracer source 130 may include a container containing a pressurized chemical tracer gas having a certain (e.g., desired) concentration. Alternatively, a pressurized chemical tracer gas may be subsequently mixed with an air or an inert gas stream to a certain (e.g., desired) concentration for selective delivery to the inlets of sample filters 110 and 112. For another embodiment, chemical tracer source 130 may include a container that contains the chemical tracer as a pressurized liquid that is converted into a gaseous chemical tracer upon release from the container. The converted gaseous chemical tracer may then be mixed with an air or an inert gas stream to a certain (e.g., desired) concentration for selective delivery to the inlets of sample filters 110 and 112.

For another embodiment, chemical tracer source 130 may include an adsorbent tube filled with adsorbed chemical tracer that may be heated or pressurized such that a certain (e.g., desired) concentration of tracer is desorbed from the tube for selective output from chemical tracer source 130 to the inlets of sample filters 110 and 112. For another embodiment, chemical tracer source 130 may include a spray nozzle that delivers liquid droplets of chemical tracer to an air or an inert gas stream, where the droplets evaporate to produce a gaseous chemical tracer with a certain (e.g., desired) concentration that is subsequently selectively delivered to the inlets of sample filters 110 and 112. For another embodiment, chemical tracer source 130 may include a saturator cell, where either an air or an inert gas stream may be bubbled through a container or packed column filled with the chemical tracer at a predetermined rate.

Non-limiting examples of suitable chemical tracer may include acetone, ammonia, alcohols, amines, a variety of water-soluble and/or polar chemicals, and/or any chemical or mixture whose flow through sample filters 110 and 112 may be delayed (or "held up") by sample filters 110 and 112 at a full range of relative humidity conditions and water loadings such as to provide discrimination between mechanical leaks (e.g., due to gasketing, settling, etc.), premature breakthrough, and the remaining life of sample filters 110 and 112 and thus filter 102. The chemical tracer and thus the chemical tracer pulse produced thereby may include a single chemical or a mixture of chemicals (e.g., binary mixtures, tertiary mixtures, etc.).

The outlets of sample filters 110 and 112 may be respectively coupled to tees 150 and 152, as shown in FIG. 1. Tees 150 and 152, and thus the respective outlets of sample filters 110 and 112, may be coupled to flow-rate controllers 154 and 156, e.g., volume or mass flow-rate controllers. Flow-rate controller 154 controls the flow rate of the portion of contaminated air that is drawn through sample filter 110 from the contaminated inlet air stream that enters filter 102, and flow-rate controller 156 controls the flow rate of the portion of purified air that is drawn through sample filter 112 from the purified air stream that exits filter 102. For one embodiment, the flow rates through sample filters 110 and 112 may be selected so that the flow velocities through sample filters 110 and 112 are substantially the same as each other. For another embodiment, the flow rates through sample filters 110 and 112 may be selected so that the flow velocities through sample filters 110 and 112 are each substantially the same as the flow velocity through filter 102. For one embodiment, flow-rate controllers 154 and 156 may be coupled to controller 140 for receiving electrical signals from controller 140 that can be used to set the flow rate outputs of flow-rate controllers 154 and 156.

The outlets of flow-rate controllers 154 and 156 are coupled to a tee 158, as shown in FIG. 1. The outlet of tee 158 is coupled to a suction device, such as a vacuum pump 160 or a blower operating in a suction mode, that draws the respective flows through sample filters 110 and 112 and flow-rate controllers 154 and 156 and delivers the respective flows to the purified air stream exiting filter 102 via a tee 180. For one embodiment, the outlet of vacuum pump 160 forms an outlet of residual life indicator 100.

Tees 150 and 152, and thus the respective outlets of sample filters 110 and 112, may also be selectively coupled to a detector 170 by a three-way valve 172, for example. When three-way valve 172 is in a first state, for example, three-way valve 172 directs a portion of the flow exiting sample filter 110 to detector 170 via tee 150. When three-way valve 172 is in a second state, for example, three-way valve 172 directs a portion of the flow exiting sample filter 112 to detector 170 via tee 152. When three-way valve 172 is in a third state, for example, three-way valve 172 prevents flow from either sample filter 110 or sample filter 112 from flowing to detector 170 and thus causes all of the flow exiting sample filters 110 and 112 to be respectively directed through flow-rate controllers 154 and 156.

For one embodiment, three-way valve 172 may be electrically coupled to controller 140. During operation, three-way valve 172 may be selectively activated, in response to receiving electrical signals from controller 140, between its first, second, and third states.

For one embodiment, detector 170 may be configured to output electrical signals indicative of chemical concentrations to controller 140. Non-limiting examples of suitable detectors 170 may include Photo Ionization Detectors (PIDs), Flame Ionization Detectors (FIDS), infrared detectors, etc. For one embodiment, controller 140 analyzes the data from detector 170 and may include algorithms for determining the residual life of sample filter 110 and thus filter 102.

A flow-rate controller 174, such as a mass or volume flow-rate controller, is coupled between the exit of detector 170 and tee 158, where tee 158 couples the outlet of flow-rate controller 174, and thus the outlet of detector 170, to vacuum pump 160. Flow-rate controller 174 controls the flow rate through detector 170 and thus the flow rate from sample filter 110 through three-way valve 172 when three-way valve 172 is in the first state or the flow rate from sample filter 112 through three-way valve 172 when three-way valve 172 is in the second state.

Residual life indicator 100 can operate in three different operating modes. For example, placing three-way valves 132 and 172 into their third states places residual life indicator 100 in a first operating mode, placing three-way valves 132 and 172 into their first states places residual life indicator 100 in a second operating mode, and placing three-way valves 132 and 172 into their second states places residual life indicator 100 in a second operating mode.

When residual life indicator 100 is in its first operating mode with the three-way valves 132 and 172 in their third states, vacuum pump 160 draws a portion of the contaminated air stream being received at the inlet of filter 102, before it enters filter 102, through filter 110, which filters the contaminated air, and through flow-rate controller 154, which sets the flow rate through filter 110 at a certain flow rate, e.g., such that the flow velocity through filter 110 is substantially the same as the flow velocity through filter 102. Therefore, the flow at the inlets of filter 102 and sample filter 110 have substantially the same level of contamination and substantially the same relative humidity.

Sample filter 110 is configured to operate in the same manner as filter 102, such that their outputs have substantially the same relative humidity and same degree of purification. For example, sample filter 110 and filter 102 may have the same adsorptive bed material (e.g., ASZM-TEDA carbon), the same bed depths d, and the same flow velocities. Therefore, sample filter 110 is configured to mimic filter 102, and at any given time, sample filter 110 will have substantially the same residual life as filter 102. Therefore, the residual life of filter 102 can be determined from a determination of the residual life of sample filter 110.

When residual life indicator 100 is in its first operating mode, vacuum pump 160 also draws a portion of the purified air stream exiting filter 102 through filter 112 and through flow-rate controller 156, which sets the flow rate through filter 112 at a certain flow rate, e.g., such that the flow velocity through filter 112 is substantially the same as the flow velocity through filter 102 and substantially the same as the flow velocity through sample filter 110. Therefore, the flow at the exit of filter 102 and the inlet sample filter 112 have substantially the same level of contamination (or purification) and relative humidity.

Sample filter 112 is configured to operate in the same manner as filter 102 and sample filter 110. For example, sample filter 112, sample filter 110, and filter 102 may have the same adsorptive bed material (e.g., ASZM-TEDA carbon), the same bed depths d, and the same flow velocities. However, since sample filter 112 is receiving purified air from filter 102, filter 112 retains its initial residual life, e.g., it has substantially the same residual life as filter 102 and sample filter 110 when filter 102 and sample filter 110 are first activated or put into service. Therefore, filter 112 acts as a reference filter that provides a baseline to which sample filter 110 is compared.

Note that the flows at the inlets of filter 102 and sample filters 110 and 112 will have substantially the same relative humidity so that filter 102 and sample filters 110 and 112 have substantially the same water loading. Therefore, any comparisons between sample filters 110 and 112 account for the effect of relative humidity or water loading, thereby eliminating the need to separately measure and separately correct for relative humidity effects.

When residual life indicator 100 is in its second operating mode with three-way valves 132 and 172 in their first states, vacuum pump 160 still draws a portion of the contaminated air stream, before it enters filter 102, through sample filters 110 and 112, and respectively through flow-rate controllers 154 and 156. In addition, a portion of the flow exiting sample filter 110 is now directed through detector 170, via three-way valve 172, and through flow-rate controller 174, which sets the flow rate through detector 170. Chemical tracer is added from chemical tracer source 130, via three-way valve 132 and tee 114, to the contaminated air flow before the contaminated air flow enters sample filter 110. The amount of chemical tracer added to filter 110 is established by the flow rate of the chemical tracer, which is set by flow-rate controller 134, and the length of time during which the chemical tracer flows, which corresponds to the time that three-way valve 132 is in its first state.

The passage of the chemical tracer through sample filter 110 is delayed or "held up" (e.g., retained) by sample filter 110, e.g., by adsorptive bed 118, so that there is not immediate "break through" of chemical tracer from filter 110. For one embodiment, the chemical tracer is selected so that, although the chemical tracer is delayed by filter 110, substantially all of the chemical tracer exits (e.g., elutes) from filter 110. In view of the fact that the relative humidity, in terms of the water vapor adsorbed by the filter, affects the length of time the chemical tracer is delayed by filter 110, the chemical tracer is further selected so that the effects of the water vapor adsorbed by filter 110 is such that the chemical tracer is sufficiently delayed by the filter so that there is not immediate "break through" of the chemical tracer from filter 110.

Three-way valve 172, in its first state, directs a portion of the flow, containing the chemical tracer, exiting sample filter 110 through detector 170. Detector 170 detects the concentration of the chemical tracer in the flow and outputs a signal to controller 140 indicative of the detected concentration. For one embodiment, detector 170 may be triggered to detect at substantially the same instant three-way valves 132 and 172 are placed into their first states, and the chemical tracer starts flowing through three-way valve 132 and tee 114 into the flow at the inlet of sample filter 110.

When residual life indicator 100 is in its third operating mode with three-way valves 132 and 172 in their second states, vacuum pump 160 still draws a portion of the contaminated air stream, before it enters filter 102, through sample filters 110 and 112, and respectively through flow-rate controllers 154 and 156. In addition, a portion of the flow exiting sample filter 112 is now directed through detector 170, via three-way valve 172, and through flow-rate controller 174. Chemical tracer is added from chemical tracer source 130, via three-way valve 132 and tee 116, to the purified air flow from filter 102 before the purified air flow enters sample filter 112. The amount of chemical tracer added to filter 112 is established by the flow rate of the chemical tracer, which is set by flow-rate controller 134, and the length of time during which the chemical tracer flows, which corresponds to the time that three-way valve 132 is in its second state.

The passage of the chemical tracer through sample filter 112 is delayed or "held up" (e.g., retained) by sample filter 112, e.g., by adsorptive bed 120, so that there is not immediate "break through" of chemical tracer from filter 112. For one embodiment, the chemical tracer is selected so that, although the chemical tracer is delayed by filter 112, substantially all of the chemical tracer exits (e.g., elutes) from filter 112. In view of the fact that sample filter 112 is substantially identical to sample filter 110, for some embodiments, the effects of the water vapor adsorbed by filter 112 is such that the chemical tracer is sufficiently delayed by the filter so that there is not immediate "break through" of the chemical tracer from filter 112.

Three-way valve 172, in its second state, directs a portion of the flow, containing the chemical tracer, exiting sample filter 112 through detector 170. Detector 170 detects the concentration of the chemical tracer in the flow and outputs a signal to controller 140 indicative of the detected concentration. For one embodiment, detector 170 may be triggered to detect at substantially the same instant three-way valves 132 and 172 are placed into their second states, and the chemical tracer starts flowing through three-way valve 132 and tee 116 into the flow at the inlet of sample filter 112.

As indicated above, sample filter 110 is configured to mimic filter 102 so that the residual life of filter 102 can be determined from a determination of the residual life of sample filter 110. That is, at any given time, sample filter 110 will have substantially the same residual life as filter 102. Moreover, sample filter 112 mimics sample filter 110 and filter 102 when filter 102 and sample filter 110 are first activated or put into service.

Figure 2:
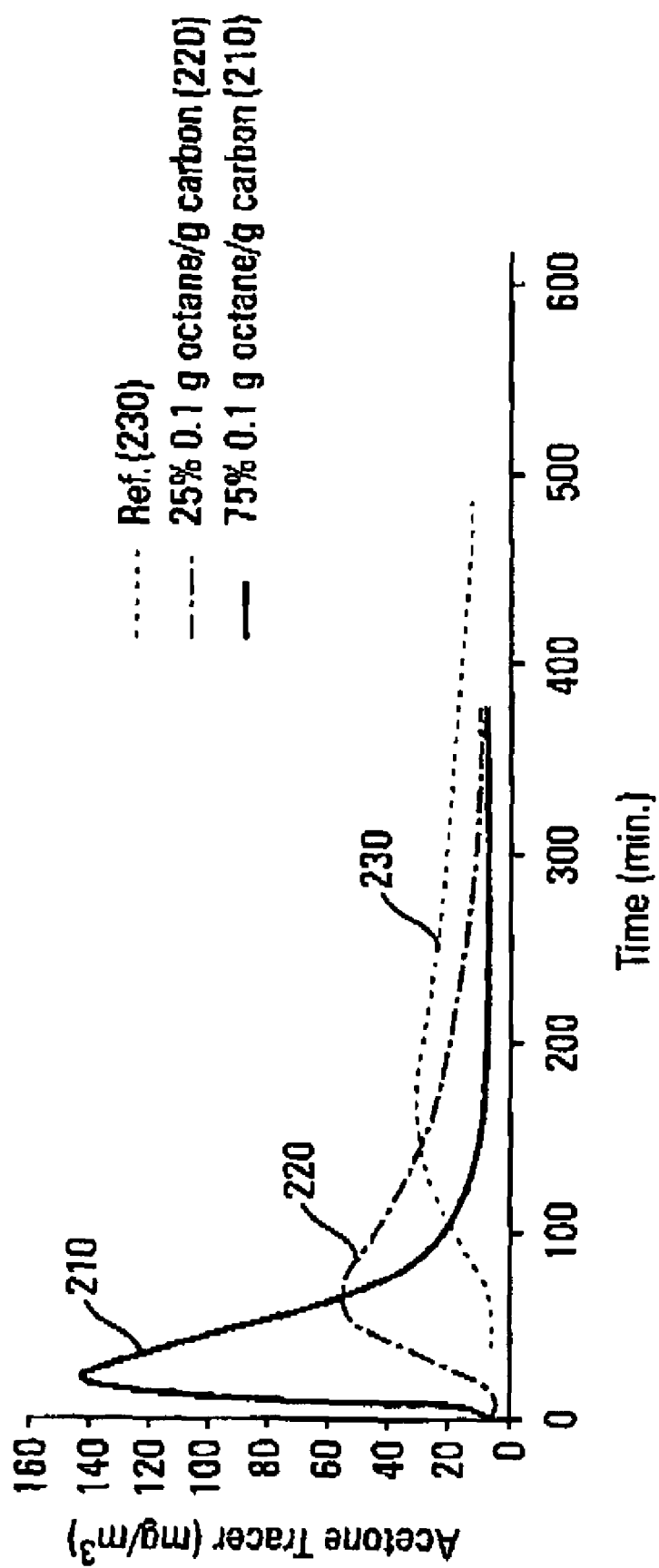
FIG. 2 presents example curves of the concentration of chemical tracer at the outlets of an embodiment of sample filters of an embodiment of a residual life indicator, according to another embodiment of the disclosure.

FIG. 2 presents example curves of the concentration of chemical tracer at the outlets of sample filters 110 and 112, e.g., using acetone as the chemical tracer, as measured by sensor 170 and curve fitted by controller 140. For one embodiment, curves 210 and 220 represent the time-wise concentration profiles of chemical tracer at the outlet of sample filter 110, obtained while residual life indicator 100 was operating in its second operating mode with three-way valves 132 and 172 in their first states. Curve 230 represents the time-wise concentration profile of chemical tracer at the outlet of sample filter 112, obtained while residual life indicator 100 was operating in its third operating mode with three-way valves 132 and 172 in their second states. Note that curves 210, 220, and 230 may also be referred to as output pulses of chemical tracer.

In the example of FIG. 2, the contaminant contained in the contaminated air stream at the inlet to filter 102 and the inlet to sample filter 110 is octane, and acetone is added to the inlet to sample filter 110 as the chemical tracer. Curve 210 is obtained for about 75 percent of adsorptive bed 118 of sample filter 110 contaminated with loading of about 0.1 gram octane/gram of adsorptive bed material, e.g., where the adsorptive bed material is carbon. Curve 220 is obtained for about 25 percent of adsorptive bed 118 of sample filter 110 contaminated with a loading of about 0.1 gram octane/gram of adsorptive bed material. Since the inlet of sample filter 112 corresponds to the filtered output of filter 102, the acetone is added to the purified air stream at the inlet to sample filter 112, and adsorptive bed 120 of sample filter 112 is substantially free of contamination. Therefore, curve 230 corresponds to a reference curve to which curves 210 and 220 can be compared.

Note that curves 210, 220, and 230 are for the same relative humidity, and thus the same water loading, and that the shapes of curves 210, 220, and 230 may vary with different relative humidities. Note further that curves 210 and 220 may be obtained for known percentages of the filter contaminated with known contaminant loadings as part of a calibration of sample filter 110 and thus residual life indicator 100. Alternatively, field data, or curves similar to curves 210 and 220, may be obtained for unknown percentages of filter 110 contaminated with unknown contaminant loadings. These curves may then be used to determine the residual life of filter 110, and thus filter 102, during the actual operation of filter 102 and residual life indicator 100 using the calibration, as is discussed below. For example, curves 210, 220, and 230 may represent calibration curves or field curves, obtained during the actual operation of filter 102 and residual life indicator 100. For one embodiment, the concentration data of the output pulses of the chemical tracer, such as the curves of FIG. 2, may be stored as data files in controller 140.

Figure 3:
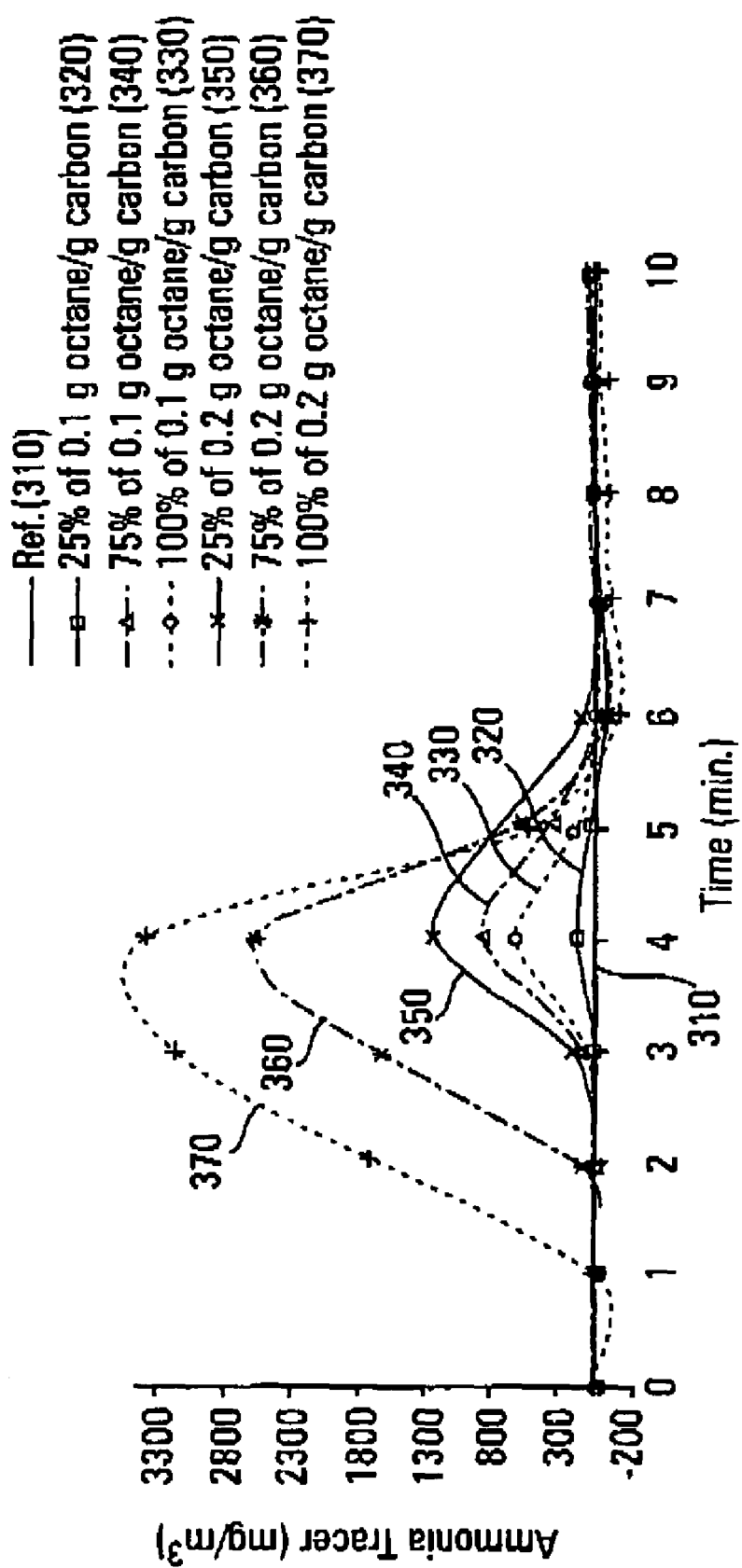
FIG. 3 presents example curves of the difference between the concentration of chemical tracer at the outlet of an embodiment of a sample filter of an embodiment of a residual life indicator and the concentration of chemical tracer at the outlet of an embodiment of a reference sample filter of the residual life indicator, according to another embodiment of the disclosure.

After obtaining the concentration data corresponding to curves 210, 220, and 230, the difference between the concentration data of curve 210 and reference curve 230 can be obtained and curve fitted, and the difference between the concentration data of curve 220 and reference curve 230 can be obtained and curve fitted, e.g., using controller 140. FIG. 3 presents an example of difference curves, e.g., using ammonia as the chemical tracer, octane as the contaminant, and carbon as the material of adsorptive bed 118 of sample filter 110 and of adsorptive bed 120 of sample filter 112.

Difference curve 310 is obtained by subtracting the concentration of the chemical tracer at the outlet of sample filter 112 from itself and is thus coincident with the horizontal axis. The remaining curves are obtained by subtracting the concentration of the chemical tracer at the outlet of sample filter 112 from the concentration of the chemical tracer at the outlet of sample filter 110. For example, difference curves 320, 330, and 340 are respectively obtained for about 25 percent, 100 percent, and 75 percent of adsorptive bed 118 of sample filter 110 contaminated with a loading of about 0.1 gram octane/gram of adsorptive bed material, and difference curves 350, 360, and 370 are respectively obtained for about 25 percent, 75 percent, and 100 percent of adsorptive bed 118 of sample filter 110 contaminated with a loading of about 0.2 gram octane/gram of adsorptive bed material, as shown in FIG. 3.

Note that sample filter 112 is substantially free from contaminants. Note further that sample filters 110 and 112 are operating at the same relative humidity and thus have substantially the same water loading. Therefore, the difference curves in the example of FIG. 3 present substantially only the effects of filter contamination and do not need to be corrected for relative humidity.

Note that the peak concentration difference increases as the percentage of the filter contaminated with a specific contaminant loading increases. The peak concentration difference also increases as the contaminant loading of a specific percentage of the filter increases. For one embodiment, the peak concentration difference may be correlated to the residual life of sample filter 110, and thus filter 102. For example, the higher the peak concentration difference the lower the residual life. However, the residual life cannot be obtained directly from difference curves, such as those shown in FIG. 3.

Note that the difference curves of FIG. 3 may be obtained for known percentages of sample filter 110 contaminated with known contaminant loadings as part of a calibration of sample filter 110 and thus residual life indicator 100. Alternatively, field difference curves, similar to those of FIG. 3, may be obtained for unknown percentages of sample filter 110 contaminated with unknown contaminant loadings for determining the residual life of filter 110, and thus filter 102, during the actual operation of filter 102 and residual life indicator 100 using the calibration, as is discussed below. For one embodiment, the difference data of difference curves, such as the difference curves of FIG. 3, may be stored as difference data files in controller 140.

Figure 4:
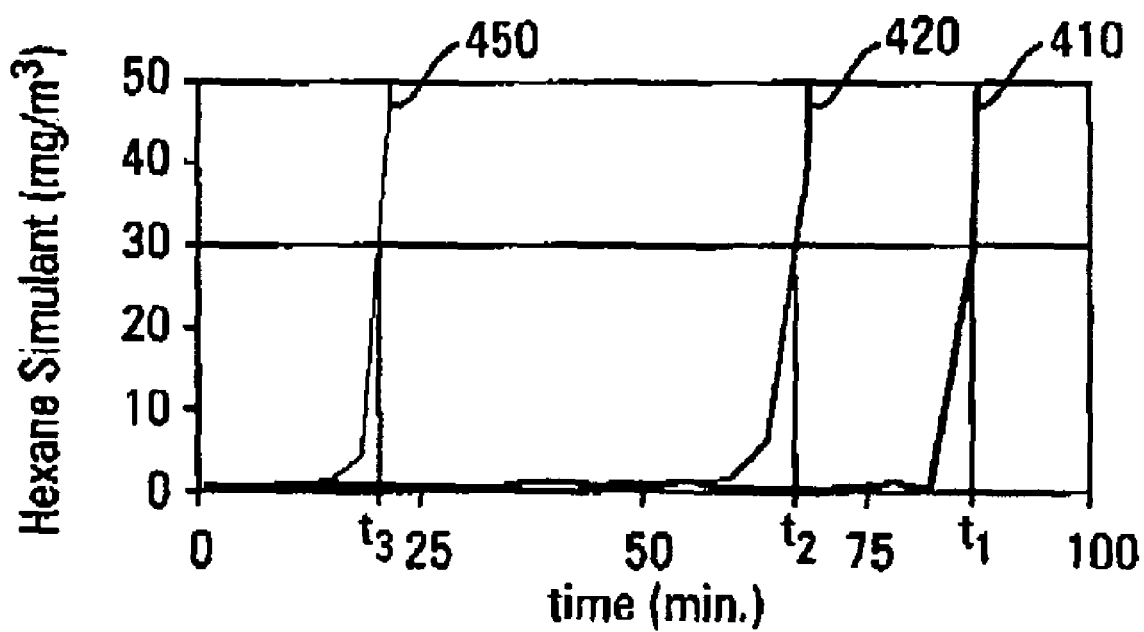
FIG. 4 provides an illustrative example of a set of "breakthrough" curves for a simulant exiting an embodiment of sample filters of an embodiment of a residual life indicator, according to another embodiment of the disclosure.

For one embodiment, a residual life may be determined for each of the difference curves of FIG. 3 from a set of "break-through" curves (or "break-through" data) by passing a chemical simulant, e.g., that simulates the contaminant in the contaminated air stream, through sample filters 110 and 112. FIG. 4 provides an illustrative example of a set of "breakthrough" curves for a simulant, such as hexane, but similar "break-through" curves may be obtained for other simulants. Break-through curve 410 is a break-through curve obtained from passing hexane through sample filter 112, which is substantially free of contamination and thus corresponds to a fresh filter, and sampling the output of sample filter 112 using detector 170. Therefore, break-through curve 410 can be thought of as a reference break-through curve. Note, for example, break-through curve 410 may correspond to a difference curve similar to difference curve 310 of FIG. 3.

Break-through curves 420 and 450 are break-through curves obtained from passing hexane through sample filter 110 for different contamination levels of filter 110 and sampling the output of sample filter 110 using detector 170. For example, break-through curve 420 may correspond to a difference curve similar to difference curve 320 of FIG. 3, and break-through curve 450 may correspond to a difference curve similar to difference curve 350 of FIG. 3.

For one embodiment, the residual life is obtained from the ratio of the time it takes, e.g., starting from the time the simulant enters sample filter 110, until a certain concentration of simulant is detected at the outlet of sample filter 110 for a certain contamination level of sample filter 110 to the time it takes, e.g., starting from the time the stimulant enters sample filter 112, until a certain concentration of simulant is detected at the outlet of sample filter 112, the substantially uncontaminated reference. For example, a concentration of 30 mg of simulant per cubic meter is detected at time $t_1$ at the outlet of sample filter 112 after the stimulant enters sample filter 112 (e.g., time=zero in FIG. 4) and can be read from break-through curve 410. For the contamination level of sample filter 110 at which break-through curve 420 is obtained, a concentration of 30 mg of simulant per cubic meter is detected at time $t_2$ at the outlet of sample filter 110 after the stimulant enters sample filter 110 (e.g., time=zero in FIG. 4) and can be read from break-through curve 420. For the contamination level of sample filter 110 at which break-through curve 450 is obtained, a concentration of 30 mg of simulant per cubic meter is detected at time $t_3$ at the outlet of sample filter 110 after the stimulant enters sample filter 110 (e.g., time=zero in FIG. 4) and can be read from break-through curve 430.

The residual life of sample filter 110 for the contamination level of break-through curve 420 is $t_2/t_1$ (e.g., about 0.76 or 76 percent for this example). The residual life of sample filter 110 for the contamination level of break-through curve 450 is $t_3/t_1$ (e.g., about 0.24 or 24 percent for this example). Note that when sample filter 110 is first installed, its break-through curve will be substantially the same as break-through curve 410 for sample filter 112, and the residual life will be 1.0 or 100 percent. For one embodiment, the data corresponding to each break-through curve and the residual life corresponding to that break-through curve may be stored in controller 140.

Note that sets of break-through curves may be obtained at different relative humidities, where the effect of the relative humidity either shifts the break-through curves of FIG. 4 to the left or right. However, the time ratios, and thus the residual life, typically remain substantially unaffected by the changes in relative humidity.

For one embodiment, a simulant, e.g., octane, may be passed through sample filter 110 for the contamination levels that respectively resulted in difference curves 320, 330, 340, 350, 360, and 370 of FIG. 3 to produce break-through curves for sample filter 110 for the contamination levels that respectively resulted in difference curves 320, 330, 340, 350, 360, and 370. A reference break-through curve may also be obtained for sample filter 112 by passing the simulant therethrough. A residual life may then be obtained for each of the break-through curves, as described above in conjunction with FIG. 4, and thus for respective ones of the difference curves, thereby correlating the residual life obtained from the each break-through curves to respective ones of the difference curves. That is, each difference curve will be have a residual life associated therewith, thereby defining a set of predetermined calibration difference curves (or difference data). Note that a set of calibrated curves may be obtained for different simulants, chemical tracers, relative humidities, flow velocities through the sample filters, different concentrations of simulants, different concentrations of chemical tracers, etc.

To obtain a residual life using residual life indicator 100 during the actual operation thereof, a difference curve similar to those of FIG. 3 is obtained, as described above in conjunction with FIGS. 2 and 3. For example, a chemical tracer is passed through filters 110 and 112 and the concentration data versus time is obtained at the outlets of filters 110 and 112 using detector 170 and is stored in controller 140. Controller 140 may then use the data to form concentration curves similar to those of FIG. 2. Controller may then subtract the concentration data at the outlet of sample filter 112 from the concentration data at the outlet of sample filter 110 to form an actual difference curve similar to those of FIG. 3. Controller 140 may then compare the actual difference data (or curve) to the calibration difference curves stored therein. Upon finding a calibration difference curve that is substantially similar to the actual difference curve, controller may indicate that the residual life of filter 110, and thus of filter 102, is the residual life associated with the calibration difference curve.

For another embodiment, controller 140 may compare the peak concentration difference of the actual difference curve to a certain concentration differences, such as the peak concentration differences of the calibrated difference curves. When the peak concentration difference of the actual difference curve is greater than or equal to a certain concentration difference, e.g., the peak concentration difference of a calibrated difference curve associated with a certain residual life, e.g., a residual life of about 25 percent or less, controller 140 may indicate that sample filter 110, and thus filter 102, has no remaining residual life.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments. It is manifestly intended that the embodiments be limited only by the following claims and equivalents thereof.

What is claimed is:

1. A residual life indicator for determining the residual life of a filter, comprising:
    a first sample filter having an inlet coupleable to an inlet of the filter whose residual life is to be determined;
    a second sample filter having an inlet coupleable to an outlet of the filter whose residual life is to be determined;
    a chemical tracer source selectively coupled to the inlets of the first and second sample filters; and
    a detector selectively coupled to outlets of the first and second sample filters; wherein the first and second sample filters and the filter whose residual life is to be determined have substantially the same residual life when first activated.

2. The residual life indicator of claim 1, wherein the detector is configured to detect concentrations of chemical tracer exiting the first sample filter or the second sample filter.

3. The residual life indicator of claim 1, further comprising a controller electrically coupled to the detector.

4. The residual life indicator of claim 3, wherein the controller is configured to determine a difference between a concentration of chemical tracer exiting the first sample filter and a concentration of chemical tracer exiting the second sample filter.

5. The residual life indicator of claim 4, wherein the controller is further configured to determine a residual life of the filter whose residual life is to be determined from the difference between the concentration of the chemical tracer exiting the first sample filter and the concentration of the chemical tracer exiting the second sample filter.

6. The residual life indicator of claim 1, wherein a bed depth of an adsorptive bed of the first sample filter is substantially the same as a bed depth of an adsorptive bed of the second sample filter.

7. The residual life indicator of claim 6, wherein the bed depths of the adsorptive beds of the first and second sample filters are substantially the same as a bed depth of an adsorptive bed of the filter whose residual life is to be determined.

8. A method of operating a residual life indicator, comprising:
    directing at least a portion of a contaminated gas flow that is being received at an inlet of a filter whose residual life is to be determined through a first sample filter of the residual life indicator;
    directing at least a portion of a purified gas flow that is exiting the filter whose residual life is to be determined through a second sample filter of the residual life indicator, wherein the purified gas flow is purified from passing the contaminated gas flow through the filter whose residual life is to be determined;
    selectively adding a chemical tracer to the at least a portion of the contaminated gas flow that is passing through the first sample filter as the at least a portion of the contaminated gas flow enters the first sample filter;
    selectively adding the chemical tracer to the at least a portion of the purified gas flow that is passing through the second sample filter as the at least a portion of purified gas flow enters the second sample filter; and
    detecting the chemical tracer exiting the first and second sample filters; wherein the filter whose residual life is to be determined has substantially the same residual life as the first sample filter.

9. The method of claim 8, wherein the first and second sample filters and the filter whose residual life is to be determined have substantially the same water loading.

10. The method of claim 8, wherein a flow velocity of the at least a portion of the contaminated gas flow through the first sample filter is substantially the same as a flow velocity of the at least a portion of the purified gas flow through the second sample filter.

11. The method of claim 10, wherein a flow velocity of the contaminated gas flow through the filter whose residual life is to be determined is substantially the same as the flow velocity of the at least a portion of the contaminated gas flow through the first sample filter and the flow velocity of the at least a portion of the purified gas flow through the second sample filter.

12. The method of claim 8, wherein a bed depth of an adsorptive bed of the first sample filter is substantially the same as a bed depth of an adsorptive bed of the second sample filter.

13. The method of claim 12, wherein the bed depths of the adsorptive beds of the first and second sample filters are substantially the same as a bed depth of an adsorptive bed of the filter whose residual life is to be determined.

14. The method of claim 8, wherein detecting the chemical tracer exiting the first and second sample filters comprises detecting the concentrations of the chemical tracer exiting the first and second sample filters.

15. The method of claim 14, further comprising determining a difference between the concentration of the chemical tracer exiting the first sample filter and the concentration of the chemical tracer exiting the second sample filter.

16. The method of claim 15, further comprising determining a residual life of the first sample filter from the difference between the concentration of the chemical tracer exiting the first sample filter and the concentration of the chemical tracer exiting the second sample filter.

17. The method of claim 15, further comprising indicating that the first sample filter and the filter whose residual life is to be determined have no remaining residual life when the difference between the concentration of the chemical tracer exiting the first sample filter and the concentration of the chemical tracer exiting the second sample filter is greater than a certain amount.

18. A method of operating a residual life indicator, comprising:
    directing at least a portion of a contaminated gas flow that is being received at an inlet of a main filter whose residual life is to be determined through a first sample filter of the residual life indicator;
    directing at least a portion of a purified gas flow that is exiting the main filter through a second sample filter of the residual life indicator, wherein the purified gas flow is purified from passing the contaminated gas flow through the main filter;
    selectively adding a chemical tracer to the at least a portion of the contaminated gas flow that is passing through the first sample filter as the at least a portion of the contaminated gas flow enters the first sample filter;
    selectively adding the chemical tracer to the at least a portion of the purified gas flow that is passing through the second sample filter as the at least a portion of the purified gas flow enters the second sample filter;
    determining a residual life of the first sample filter from a difference between concentrations of the chemical tracer exiting the first and second sample filters; and
    taking the residual life of the main filter to be that of the first sample filter.

19. The method of claim 18, wherein determining a residual life of the first sample filter from a difference between concentrations of the chemical tracer exiting the first and second sample filters comprises determining the first sample filter to have no remaining residual life when the difference between concentrations of the chemical tracer exiting the first and second sample filters is greater than a certain amount.

20. The method of claim 18, wherein determining a residual life of the first sample filter from a difference between concentrations of the chemical tracer exiting the first and second sample filters comprises comparing the difference between concentrations of the chemical tracer exiting the first and second sample filters to a predetermined difference between concentrations of the chemical tracer exiting the first and second sample filters.

21. The method of claim 20, wherein the predetermined difference between concentrations of the chemical tracer exiting the first and second sample filters is associated with a residual life determined from a set of break-through data.

22. The method of claim 21, wherein the set break-through data are obtained from passing a simulant of a contaminant of the contaminated gas flow through the first and second sample filters.

* * * * *